United States Patent [19]
Leibowitz

[11] Patent Number: 5,494,001
[45] Date of Patent: Feb. 27, 1996

[54] CANINE LAVATORY FACILITY

[76] Inventor: Jake Leibowitz, 2108 Quentin Rd., Brooklyn, N.Y. 11213

[21] Appl. No.: 325,685

[22] Filed: Oct. 19, 1994

[51] Int. Cl.$^6$ .................................................. A01K 1/035
[52] U.S. Cl. ........................ 119/163; 119/168; 119/905; 4/395
[58] Field of Search ...................................... 119/161, 162, 119/163, 164, 165, 168, 905; 206/44 R, 45.13, 45.24; 4/313, 395, 394

[56] References Cited

U.S. PATENT DOCUMENTS

| | | | |
|---|---|---|---|
| 1,773,141 | 8/1930 | Hodgson | 119/165 |
| 2,745,109 | 5/1956 | Stuart, Jr. | 4/394 |
| 3,318,285 | 5/1967 | Betham | 119/163 |
| 3,771,491 | 11/1973 | Hunter | 119/163 |
| 4,443,898 | 4/1984 | Aguero | 4/313 |
| 4,979,469 | 12/1990 | Clark | 119/161 |
| 5,117,780 | 6/1992 | Wooten et al. | 119/162 |

Primary Examiner—Todd E. Manahan
Attorney, Agent, or Firm—Israel Nissenbaum

[57] ABSTRACT

A canine lavatory of modular construction for effective toilet training and continued use. A suitable site is selected and the dog is trained to relieve itself at-the site (typical training for a dog) and the lavatory enclosure is gradually built therearound after the dog has become enured to use the particular site. The lavatory comprises an enclosure with an open, readily accessible entrance having a flushing activating member for automatic activation by the entrance of the dog within the enclosure. The lavatory further comprises flushing and gravity dependent drainage systems. The flushing mechanism is adapted to be activated to fill to level and then to automatically trip flush. The filling and flush trip are adjustably timed according to dog habit and need. With the timed fill and self flush, the water fill system is completely purged of above-ground residual water to prevent freezing in an outdoor facility. Water purging is automatic with the water fill being initially forced directly against gravity throughout its fill path until it reaches the point of flushing. Release of filling pressing causes the water in the system to drain, by force of gravity.

17 Claims, 3 Drawing Sheets

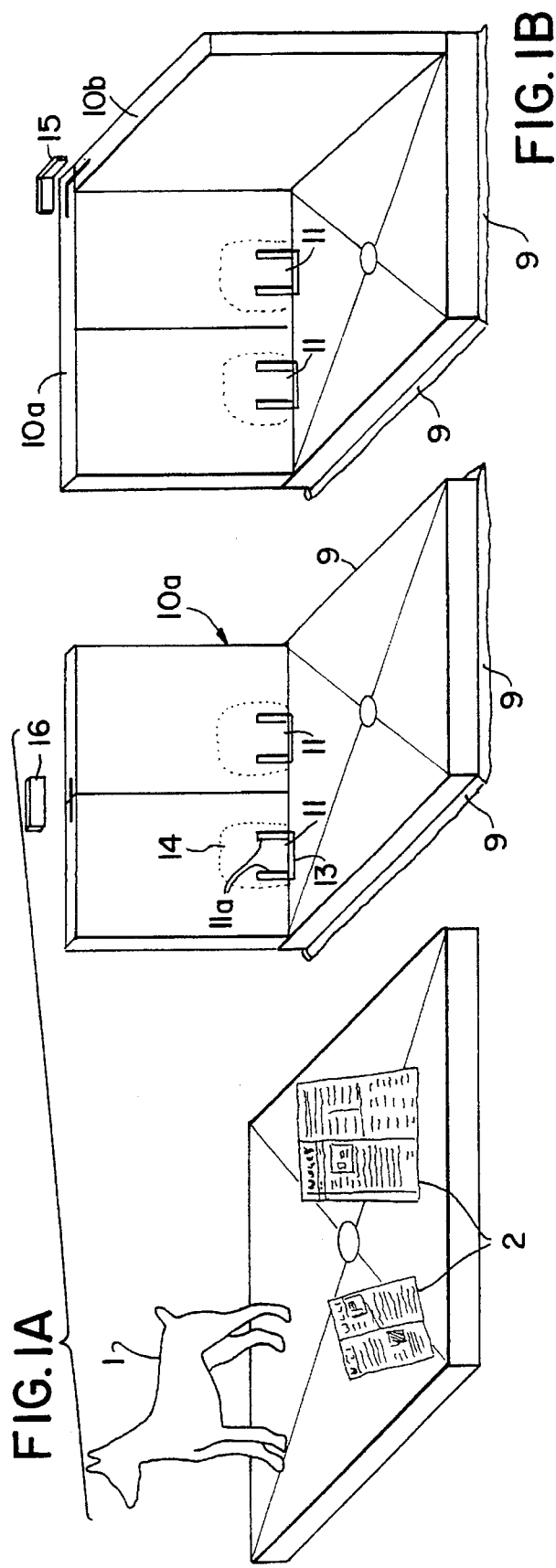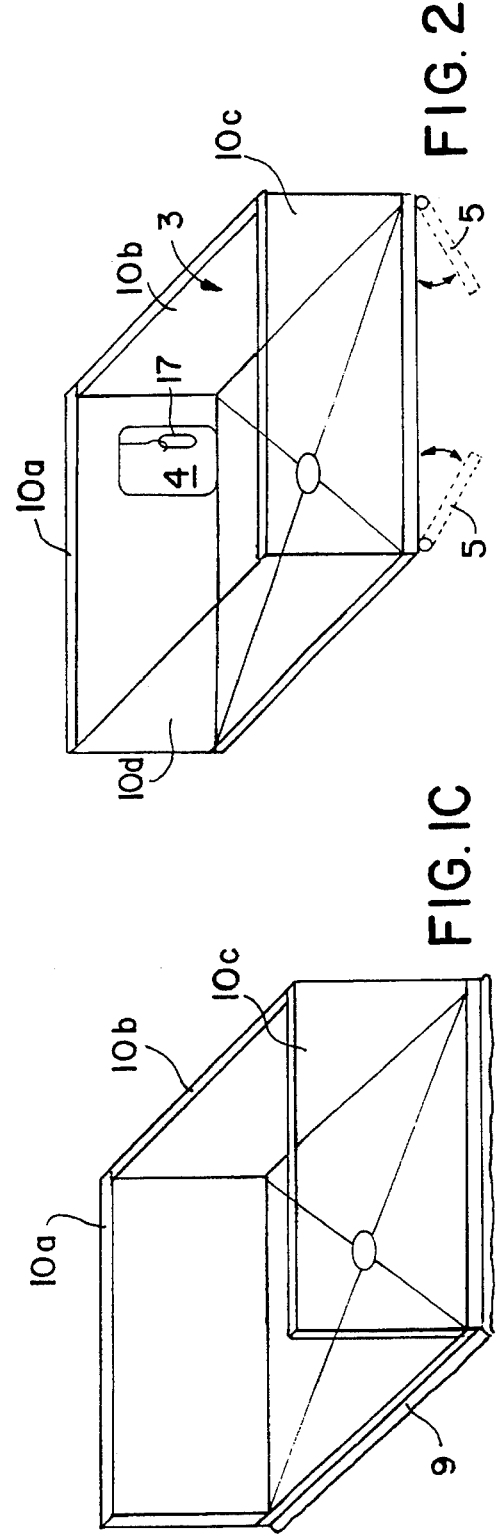

CANINE LAVATORY FACILITY

FIELD OF THE INVENTION

This invention relates to toilet training and use facilities for pets and in particular to toilet facilities for canines.

BACKGROUND OF THE INVENTION

Various lavatories for canines (dog toilets) have been developed in the prior art which are adapted with the use of plumbing and a flushing mechanism. These lavatories include those in which the dog activates a timing mechanism, upon entering the facility, for causing a flushing of the interior of the lavatory (from stored water tanks or pressurized water source), after the dog has departed the facility. Some facilities rely on the weight of the dog to indicate the dog's presence therein and whereby flushing is delayed until the physical departure of the dog.

There are however several major drawbacks with such prior art facilities. First and foremost, in the main, these toilets are designed as completed prefabricated enclosures with entrance(/exit) and sometimes separate exit doors. With such full enclosures, while it is possible to coax a dog to enter into an enclosure, it is difficult or well nigh impossible to induce a dog to enter into a particular enclosed area in order to perform its excretory functions there. Secondly, because of the nature of the dog toilets and the necessity for connection to a separate sewer line it is usually desirable to maintain such facilities outside the human dwelling such as in a back yard. However, a major problem with outdoor dog toilet facilities, as with any outdoor installation involving plumbing fixtures and water use, is the factor of exterior corrosive environment. This is of especial concern in conjunction with electrical switching elements as is required in many prior art embodiments. Another major concern is the real probability of plumbing line and water tank freezing in inclement weather and winter environment conditions.

It is an object of the present invention to provide a method and structure for a canine lavatory which is amenable to ready training and use by the canine as a toilet facility.

It is a further object of the present invention to provide a sanitary dog toilet suitable for exterior use.

It is a still further object of the present invention to provide such dog toilet facility, whereby the elements thereof are resistant to exterior corrosive conditions and wherein water freezing is not problematical.

It is yet another object of the present invention to provide such canine toilet facility whereby it is of economical construction and use, with novel plumbing fixture arrangements.

These and other objects, features and advantages of the present invention will become more evident from the following discussion and the drawings in which:

SHORT DESCRIPTION OF THE DRAWINGS

FIGS. 1a–c depict the stepwise construction of the modular canine lavatory of the present invention whereby a dog is trained to use a particular area for its excretory function while being gradually enclosed.

FIG. 2 depicts the completed enclosure with an entrance therein with a pendant sealed mercury switch, which, when struck by the entering dog, initiates operation sequencing.

FIG. 3b is a side view of the embodiment of FIG. 3a; and

FIG. 3c is a top view of the embodiment of FIG. 3a;

SUMMARY OF THE INVENTION

Figure 3:
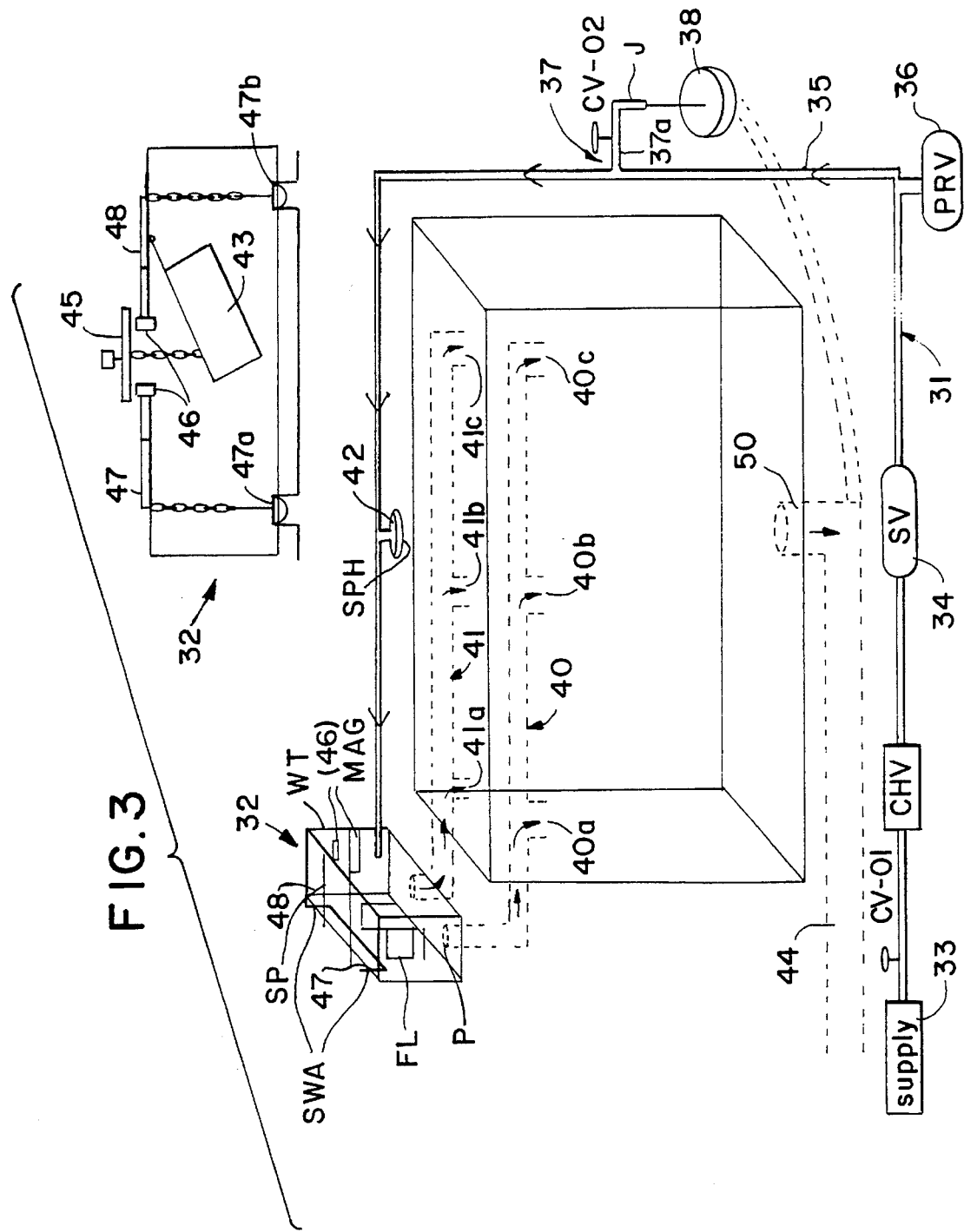
FIG. 3, is a schematic view showing the plumbing arrangement for water filling of a flush tank and and an embodiment of the trip mechanism being used for flushing.

Generally the present invention comprises a canine lavatory or dog toilet and a method of canine toilet training therewith, wherein the dog toilet is comprised of modular enclosure elements, separably constructable into a full enclosure over a period of time. Each of the elements is provided with self supporting means and means for connection with a further element, which is added thereto.

In a preferred embodiment of the present invention, the canine lavatory is comprised with flushing means wherein water filling and dispensing for flushing and cleaning is only at the time of use, and wherein means are provided to remove water from the water filling and flushing means when the atory facility is not in use. Water freezing with structural damage is avoided thereby.

In another preferred embodiment of the present invention, switches, timing mechanisms, and other electrical components subject to detrimental corrosion in the presence of moisture are completely insulated from such moisture and corrosion.

The canine lavatory comprises an enclosure having an entrance to permit entry of a canine therein; water supply means; water reservoir means, with said reservoir means being filled by the water supply means; means for flush cleaning the interior of said enclosure with water from the water reservoir means; water drainage means; and means for said canine to activate supply of water to the water reservoir; wherein said enclosure is comprised of modular enclosure elements, separably constructable into a full enclosure over a period of time, and wherein said enclosure elements are provided with supporting means and means for fixed proximate juxtaposition between said elements.

DETAILED DESCRIPTION OF THE INVENTION

A dog, normally inhibited from performing excretory functions in an unfamiliar enclosed area, may be trained therewith to become inured to use a particular area for its excretory functions, without being put into a threatening position. In this respect, the lavatory of the present invention is provided with means whereby it is buildable around the dog training area (e.g., with the common method of newspaper training), in stages, over a number of uses by the dog.

As the dog become familiar with portions of the enclosure structure already erected (a wall or portion of a wall), small incremental additions are added, until the entire enclosure is completed. When the dog is fully familiar with the enclosure as a toilet facility, it can then be readily moved to any other convenient position (such as in proximity to a water supply or on top of a pre-existing drain) for use by the dog, without the necessity for retraining. In an embodiment wherein the enclosure is used indoors, the base of the enclosure is provided with locking, extensible legs (and optionally with wheels for facilitated movement), whereby the enclosure can be lifted sufficiently for elevated placement over an existing toilet for use thereof as the drain. In this embodiment it is further preferred that the entrance to the enclosure be provided with steps or a ramp in order to facilitate entry of the dog therewithin.

The modular configuration and gradual construction of the dog toilet of the present invention obviates a major drawback of the completely constructed lavatories of the prior art, wherein, while they may be technically marvelous, they do not take into account the nature of dogs, and as a matter of reality, a dog will not use them.

The walls of the lavatory are preferably constructed of readily washable plastic and are preferably connected with snap fittings, corner connection fittings, holding and/or supporting tracks, fixtures and the like. Cooperative elements at the ends of the enclosure walls form flush fitting corners. Wall segment elements, are similarly abutted and held with close fitting seams to facilitate subsequent complete cleaning and draining during flushing.

The walls, if separately placed, embody supporting elements. The supporting elements should however have the major portions thereof situated external to the structure in order to minimize interference with the washing of the walls after lavatory use. Alternatively, if tolerated by the dog, self supporting corner elements of two walls (or wall portions) may be utilized.

Once the walls are constructed into an enclosure, with entrance and exit openings (usually they are the same), water pipes or conduits, for introduction of washing water, are then installed, relative to the enclosure, as are the plumbing fixtures with flushing mechanism and drain system. Alternatively, the pipes or conduits can be prefitted or initially formed within the walls of the enclosure, for appropriate connection and installation. In either embodiment, the plumbing fixtures are connected with water supply means, filling tank and flushing means and the spraying or water dispensing means for effecting the actual flushing cleaning of the enclosure, of waste into a drain usually connected to a sewer line or septic tank.

For ease of construction, the water feed and dispensing elements (pipes, shower elements, and water tank) are adapted for modular fitting with the cooperative holding sections of the wall elements. Activation means is linked to the water feed and dispensing elements for water filling and flushing relative to activation by the dog.

The plumbing system of the dog lavatory of the present invention is specifically designed to avoid any residual water in the system between uses, whereby freezing is avoided. In accordance with the present invention, the lavatory comprises means which is triggered by the dog, to initiate a timer which marks a preselected time, determined to be suitable for the dog's particular time of use. Thereafter, at the end of the pre-selected time, when the dog has already left the enclosure, a solenoid is activated to begin the process of filling of a water tank or reservoir for flushing. When the reservoir is sufficiently filled (over a predetermined, timed period of time), automatic trip flushing means effect flushing, of the interior of the enclosure, with rinsing of the walls, and optionally with the filling of an externally situated water bowl. In addition, a timer set to count down the period of time required to fill the water tank, closes the solenoid (with a cut-off of water pressure in the line) upon the completion of filling of the water reservoir. In an alternative embodiment the trigger means are included as starting the water filling, for subsequent flushing only after the dog has left the enclosure, e.g., with a motion detector (lack of motion effects the triggering) or such trigger means comprises a one way exit switch which starts the water filling.

A preferred automatic trip flushing means comprises a float which is raised and which thereby causes the reservoir tank to open with release of water into the enclosure. This release of water washes the walls and base of the enclosure via a gravity drop through shower pipes at the top of the enclosure. Debris and waste are rinsed toward and out of a drain in the base of the enclosure. Means are also provided to permit gravity draining of the residual water remaining in the filling system with the trip flushing. Between uses there is no residual water in the system, in either the pipes or the tank reservoir, which could tend to freeze. In addition, with the present system, since filling and flushing occur only after the dog has left the enclosure, there are no untoward or unfamiliar sounds which may tend to inhibit the dog from the using the facility. To ensure that the dog does not overstay its time in the facility, thereby subjecting itself to possible traumatic water soaking, either the tank is filled directly after the dog has left the enclosure, or the dog activates the water filling only upon its exit from the enclosure.

In a preferred embodiment of the present invention, the timing and triggering system are sealed units and operable as such even over long time periods of exposure to the elements which have corrosive effects. A mercury switch, is contained within a pendant which blocks entry through the entry door and which the dog must contact upon entry. Movement of the mercury switch causes a timer to switch on to start its countdown, as described. Since a mercury switch operates by movement of the mercury therein without external exposure it is highly preferred for the present application. It is completely sealable without operative necessity for exposure and it is or can be made substantially or entirely impervious to external elements. Alternatively, the switch is a one-way exit switch such as a contact hinge which activates water filling rather than a timer, only when hinged in the exit direction.

After the water reservoir is filled and the water is dispensed from the tank, water pressure is relieved through the feed pipe (dispensing pipes and water bowl filling), with closure of the water line by a solenoid, and a one way pressure feed valve opens to permit draining of water from the pipes back into the ground. As a result, all water in the system is removed from the system by being dispensed through the cleaning shower, into a water bowl and/or drained back (by gravity) into a depressurized water feed source. Freezing and cracking of pipes and tanks is thereby avoided.

DETAILED DESCRIPTION OF THE DRAWINGS AND THE PREFERRED EMBODIMENTS

With specific reference to the drawings, in FIGS. 1a–c, a dog 1, is shown being trained to effect its toilet function on a newspaper 2 in a common manner. With such training, the dog 1, is gradually enclosed with wall enclosure elements 10a–d. The wall enclosure elements are each supported by stand member 11, which is comprised of a base 13 having a relatively large external lateral support 14 and two small front clips 11a. It is preferred that all support elements which extend into the enclosure be of minimal dimension to reduce interference with flushing and rinsing.

As the enclosure 3 is being gradually erected, the wall enclosure elements are connected with corner connection elements 15 and lateral connection elements 16 are adapted to connect the respective enclosure elements at corners and in middle of walls until the enclosure is completed with entrance 4. Optional track 9 may be used to support the enclosure elements and to hold them in close juxtaposition. As shown in dotted lines, the base of the enclosure may be provided with extensible legs 5 which elevate the enclosure for placement thereof atop an existing commode, as the drain element.

As shown in FIG. 2, sealed mercury switch 17 is disposed in the entrance 4 where the dog must brush against it to activate the switch therein. Movement starts a timer (not shown) to begin the activation cycle for the cleaning of the enclosure. The switch may be of a one-way character wherein only movement in an exit direction activates the switch to begin water filling (rather than activation of a timer) with the exit of the dog from the enclosure.

After the enclosure has been completely erected, the plumbing, filling system 30, depicted in FIGS. 3 and 3a–c, is integrated therewith. The water filling 31 and reservoir 32 elements, shown in FIG. 3 are connected to existing water source 33 which is situated below ground at a relatively constant above-freezing temperature. FIG. 3 further depicts the flushing arrangement of pipes 40 and 41, with respective outlets 40a–c and 41a–c and centrally located sprinkler head 42.

In operation, after the timer has completed its countdown, solenoid 34 opens, allowing admittance of water through water filling pipe 35 from pressurized water source 33. The water passes through one way pressure relief valve 36 and continues above ground (or from another insulated source) in a constant upward direction until the water reaches water reservoir 32. Since the dog is no longer in the enclosure, the pressurized water filling serves the initial purpose of branching off at 37 to small diameter pipe 37a to forcefully rinse and fill water bowl 38 (excess water drains to sewer line 44). The entering water also passes through sprinkler head 42 to initiate washing. The greatest mass of water continues up to water reservoir 32, and as shown in the blow up portion, as the reservoir fills, air filled float 43 rises until the water level reaches an adjustable predetermined desired level. At the predetermined level, the float 43 dislodges a hinged flat strike plate 45, mounted to the reservoir body above the float 43, and held down by gravity and magnetic member 46. When sufficient pressure is exerted by the float 43 (because of continued water filling), against the strike plate 45, to counter the forces of gravity and magnetism, the strike plate swings up and strikes swivel arms 47 and 48, which are in turn connected to drain stop plungers 47a and 47b. The drain stop plungers are lifted by the motion of the swivel arms, and water leaves the reservoir 32 through exposed drains leading to pipes 40 and 41 and thereafter through outlets 40a–c and 41a–c to flush and wash the interior of the enclosure. With such release, the float 43 drops as does the strike plate 45, thereby causing the drain stop plungers 47a and 47b to be reseated. At the same time a second timer, activated with the termination of timing of the first timer (and departure of the dog from the enclosure) set for a time sufficient to permit filling of the water reservoir, serves to close the solenoid 34. This results in closure of the inlet line and isolation of the water supply from the plumbing system. Water pressure is relieved and the system begins to drain.

Figure 3A:
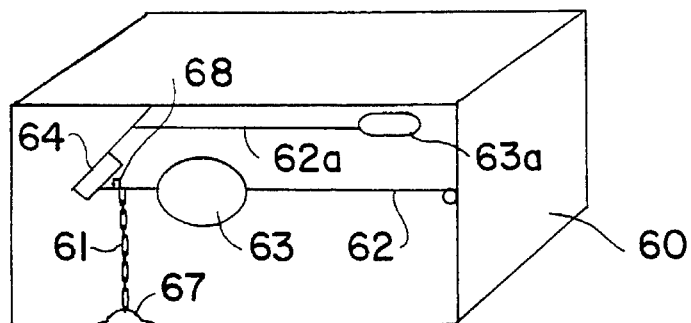
FIG. 3a, is a schematic view showing a second embodiment of the trip mechanism used for water filling of a flush tank and the flushing thereof.
Figure 3B:
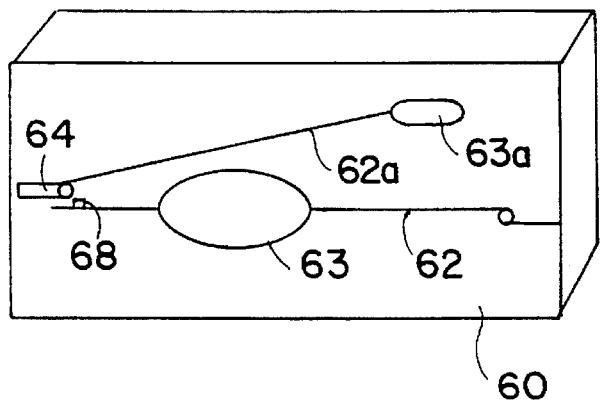
Figure 3C:
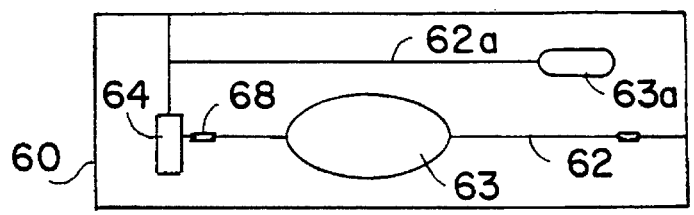

In the alternative embodiment shown in FIGS. 3a–c, a dual float system is employed to effect the automatic flushing. Float 63 is hingedly attached to the water reservoir tank 60 via control rod 62. Rod 62 is attached, at its free end, to stopper member 67 via a chain 61. The free end of rod 62 is held down by weight or latch member 64, until float 63a is elevated by the increasing water level in the tank to a predetermined level. Float 63a, with longer leverage rod 62a, at the predetermined level, raises weight or latch member 64, thereby releasing the free end of rod 62. As a result, float 63, held down by resistance to flotation, is freed and pops up to suddenly release stopper member 67. Water in the tank is thereby entirely released. The free end of rod 62a comprises one-way hinged section 68, whereby the rod remains rigid upon lifting and movement of member 64 out of the way. Upon reseating, hinged section 68 folds upwardly whereby the rod 62a can pass latch member 64 for reseating of the stopper member 67. Use of float 63 alone is ineffective in entirely releasing stored water since gradual flotation of float 63 results in seepage and reseating of the float when the level descends slightly with a continued seepage-closure cycle.

Enclosure drain 50, leading to sewer line 44 is centrally located within the enclosure and is at a somewhat lower level than the remainder of the floor of the enclosure to ensure complete draining and waste removal.

After the flushing water has exited through the drain 50, no residual water remains in the water reservoir 32. Water in the flushing lines 40 and 41 is completely emptied by gravity. Water in the water inlet line 35 drains completely in the downward direction, since line 35 extends straight down and water pressure is relieved by closure of the solenoid 34. Water pressure is further relieved at the sprinkler head 32 and at the water bowl filling at 37a. Residual water drains through the one way pressure relief valve 36 away from the pipe lines, thereby automatically preventing any problems with freezing environment.

It is understood that the above description and drawings are exemplary of the present invention and that changes in structure, placement of elements, type of components, as well as changes in procedure are possible without departing from the scope of the present invention as defined in the following claims. It is also understood that while the plumbing system described has specific applicability to outdoor dog toilets, it has similar applicability to any device requiring flushing and which is susceptible to freezing if water would remain therein.

What is claimed is:

1. A canine lavatory comprised of an enclosure having an entrance to permit entry of a canine therein; water supply means; water reservoir means, with said water reservoir means being filled by the water supply means; means for flush cleaning the interior of said enclosure with water from the water reservoir means; water drainage means; and means for said canine to activate supply of water to the water reservoir; wherein said enclosure is comprised of modular enclosure elements, separably constructable into a full enclosure over a period of time, and wherein said enclosure elements are provided with supporting means and means for fixed proximate juxtaposition between said elements, wherein said water supply means fills the water reservoir means with a continuous feed against the force of gravity and wherein said lavatory further comprises means adapted to permit gravity draining of water from the water supply means.

2. The canine lavatory of claim 1, wherein said supporting means comprises a track member adapted to engage lower edges of said enclosure elements.

3. The canine lavatory of claim 1, wherein said supporting means comprise separate stands, and said enclosure elements comprise panel elements, with each of said stands adapted to hold the enclosure elements in an upright position.

4. The canine lavatory of claim 1, wherein said means for fixed proximate juxtaposition comprises snap fitting interconnective elements adapted to engage adjacent enclosure elements.

5. The canine lavatory of claim 1, wherein the enclosure comprises means for placement on an existing toilet fixture.

6. The canine lavatory of claim 1, wherein said means for flush cleaning is activated by water flush activation means with filling of the water reservoir means to a predetermined level.

7. A canine lavatory comprised of an enclosure having an entrance to permit entry of a canine therein; water supply means; water reservoir means, with said water reservoir means being filled by the water supply means; means for flush cleaning the interior of said enclosure with water from the water reservoir means; water drainage means; and means for said canine to activate supply of water to the water reservoir; wherein said enclosure is comprised of modular enclosure elements, separably constructable into a full enclosure over a period of time, and wherein said enclosure elements are provided with supporting means and means for fixed proximate juxtaposition between said elements wherein said means for flush cleaning is activated by water flush activation means with filling of the water reservoir means to a predetermined level, wherein said water reservoir means comprises at least one aperture and said water flush activation means comprises a float member attached to closure means for such at least one aperture, whereby filling of the water reservoir causes said float member to move and remove the closure means from the at least one aperture whereby water contained in said water reservoir is completely emptied by the force to gravity and whereby the closure means re-closes the at least one aperture thereafter.

8. The canine lavatory of claim 7, wherein said float member is restrained from rising, with filling of the water reservoir, by a weight latch means and wherein the weight latch means is released from restraining the float member by a float element attached thereto, whereby the float member is released suddenly to effect water flushing.

9. The canine lavatory of claim 7, wherein magnetic means hold the closure means in position to sealingly close the at least one aperture.

10. The canine lavatory of claim 1, wherein said water supply means comprises solenoid means which controls flow of water to the water reservoir means and one way pressure relief valve means adapted to permit draining of water from the water supply means with the closing of the solenoid means and the cutoff of water in the water supply means.

11. The canine lavatory of claim 10, wherein said solenoid means is activated by timer means to cause water to flow under pressure to the water reservoir, wherein said means for said canine to activate supply of water to the water reservoir activates the timer means for a pre-selected period of time, after which the timer means effect said activation of the solenoid and wherein upon filling of the reservoir, solenoid closure means causes said closing of the solenoid means to shut off further supply of water to the water reservoir.

12. The canine lavatory of claim 11, wherein said means for said canine to activate supply of water to the water reservoir comprises a sealed mercury switch element pendently positioned at an entrance to the enclosure in the path of an entering canine.

13. The canine lavatory of claim 11, wherein said means for said canine to activate supply of water to the water reservoir comprises motion detection means which detects the presence of a canine within said enclosure.

14. The canine lavatory of claim 1, wherein a water bowl is affixed to the exterior of the enclosure and connected to said water supply means, wherein said water filling of the water reservoir also serves to rinse and fill said bowl.

15. The canine lavatory of claim 14, wherein said water flushing means further serves to rinse and fill said water bowl through said connection between the water supply means and the water bowl.

16. A method of toilet training of a canine to utilize a canine lavatory comprised of an enclosure having an entrance to permit entry of a canine therein; water supply means; water reservoir means, with said water reservoir means being filled by the water supply means; means for flush cleaning the interior of said enclosure with water from the water reservoir means; water drainage means; and means for said canine to activate supply of water to the water reservoir; wherein said enclosure is comprised of modular enclosure elements, separably constructable into a full enclosure over a period of time, and wherein said enclosure elements are provided with supporting means and means for fixed proximate juxtaposition between said elements, said method comprising the steps of:

a) inducing the canine to perform its excretory function in a specific area;

b) periodically placing the modular enclosure elements into fixed proximate juxtaposition with each other around the area used by the canine for its excretory function, to gradually form said full enclosure, without upsetting the canine, whereby the canine is inured to enter the enclosure through the entrance and to activate supply of water to the water reservoir means.

17. A toilet filling and flushing system comprising water supply means; water reservoir means, with said water reservoir means being filled by the water supply means; water flush activation means for draining said water reservoir means; wherein said water reservoir means comprises at least one aperture and said water flush activation means comprises a float member attached to closure means for such at least one aperture, whereby filling of the water reservoir causes said float member to move and remove the closure means from the at least one aperture whereby water contained in said water reservoir is completely emptied by the force of gravity and whereby the closure means re-closes the at least one aperture thereafter and wherein said flushing system further comprises means adapted to permit gravity draining of water from the water supply means.

* * * * *